Aug. 11, 1931.   J. C. McDONALD   1,818,929
ELECTRIC METER SYSTEM
Filed May 15, 1930   2 Sheets-Sheet 1
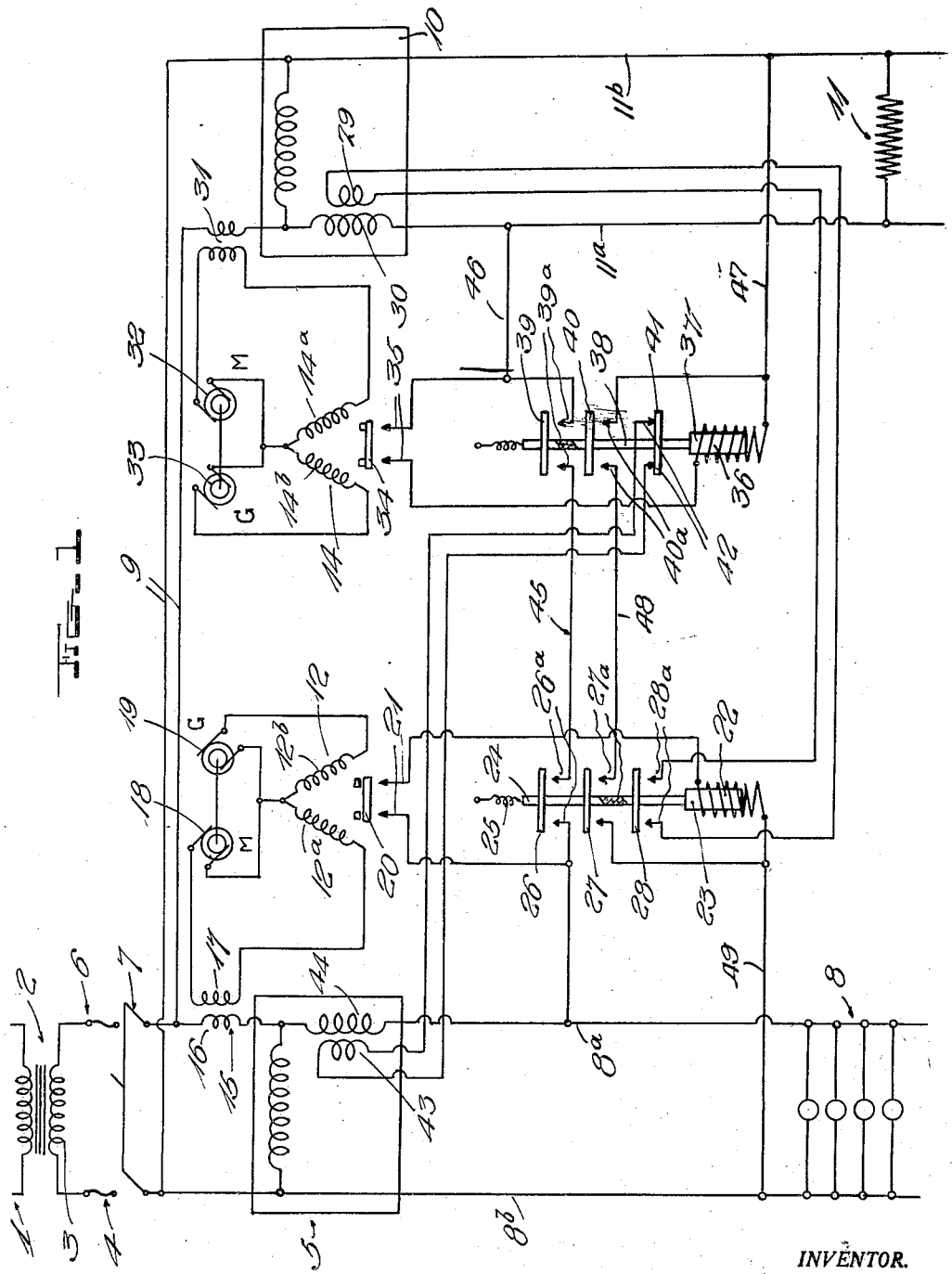
INVENTOR.
John C. McDonald,
BY
John B. Brady
ATTORNEY

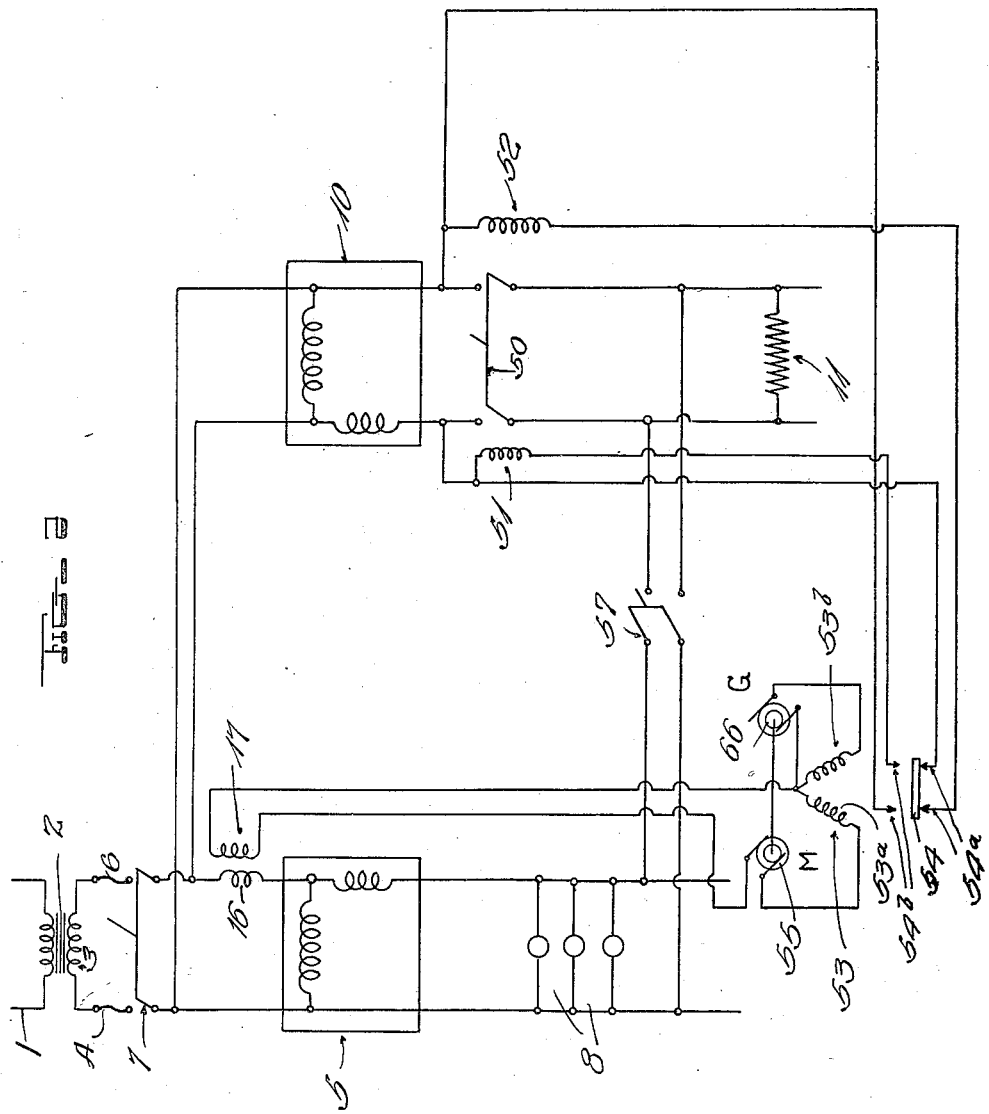

Patented Aug. 11, 1931

1,818,929

UNITED STATES PATENT OFFICE

JOHN C. McDONALD, OF NEW YORK, N. Y., ASSIGNOR OF ONE-HALF TO EDWARD L. CORBETT, OF NEW YORK, N. Y.

ELECTRIC METER SYSTEM

Application filed May 15, 1930. Serial No. 452,638.

My invention relates broadly to power distribution systems and more particularly to a meter circuit for use in power distribution systems.

One of the objects of my invention is to provide an automatic apparatus which may be connected with the usual watt hour meter in a customer's installation for automatically determining the consumption of power for loads of different character.

Another object of my invention is to provide an automatic apparatus which may be connected in circuit with the customer's electric meter in a power consuming installation by which consumption of power through different loads may be measured at rates determined by the time of day at which the power or lighting load is consumed.

A further object of my invention is to provide an automatic apparatus which may be connected in a customer's meter circuit and which will automatically register for the customer the current used for different characters of load at the same time enabling the customer to enjoy reduced rates for the different characters of load, depending on the time of day at which the power is consumed and depending upon the aggregate proportions of the power of different characteristics.

Other and further objects of my invention reside in the construction of an automatic measuring apparatus for light and power loads as set forth more particularly in the specification hereinafter following by reference to the accompanying drawings, in which:

Figure 1 illustrates one form of meter circuit for a subscriber's installation for independently measuring the consumption of current for a lighting load or an industrial load; and Fig. 2 shows a modified measuring circuit in which an industrial load may be used in connection with the lighting load of a subscriber's circuit for all times except a limited period during the peak lighting load.

My invention is directed to a system for measuring the consumption of power whereby the subscriber may elect the rate which he must pay for the use of power for lighting or industrial purposes. Heretofore, public utility companies have provided subscriber installations with separate meters, one meter being employed for the lighting load and another meter being employed for the industrial load. The rate charged for the power supplied to the industrial load is considerably less than the rate charged for the lighting load. However in fixing such rates, public utility companies have employed time control mechanism at each subscriber's circuit to prevent the use of power for the industrial load except at given times; for example between the hours of 12 a. m. and 6 a. m. a subscriber may enjoy reduced rates for the industrial load but such reduced rates are not in effect outside of such limited hours and normally no service at the industrial rate is obtainable except at the prescribed hours. Any power consumed for industrial purposes outside of the limited prescribed hours must be paid for at the rate charged for the lighting load but even this is impractical with a completely wired system.

My invention contemplates a customer's installation for measuring power consumed for industrial or lighting purposes at a sliding scale of rates, a selection of such rates being entirely at the option of the customer by the amount of load which he consumes at different times and by the ratio of the loads, one with respect to the other. The customer's installation which I employ includes two meters, one for the lighting load and another for an industrial load such as the heating load. Each meter may be used independently at its regular rate. In my system this rate does not vary until both meters are used simultaneously. Then the resulting hour composite rate will be automatically determined by the ratio of power consumption between the lighting load and the heating load with respect to each other. For example, when only a lighting load is employed the rate may be 7¢ per kilowatt hour on the lighting circuit meter; when only the heating circuit meter is employed the rate may be for example 3½¢ per kilowatt hour on the heating circuit meter. When the light and heat are being consumed simultaneously the composite rate will be enjoyed by the consumer, such as 5¼¢ per kilowatt hour for the over-all power consumption. This rate may actually obtain during the peak load when using both light and heat. As a further example, when using 20 kilowatt for light and heat at the peak load, the revenue to the company will be $1.05, that is if the proportions of the lighting load and the heating load are even the customer will pay 7¢ for light and 3½¢ for heat. When the proportions of consumption are not even the customer may for example consume 1 kilowatt for the lighting load at a rate of 7¢ and 19 kilowatt for heating load, aggregating 66¢, making a total of 76¢. Thus it will be seen that if the consumer uses his heat load on the peak time his rate for heat goes from 3½¢ to 5¢, automatically, and he is penalized to the extent of 32¢. That is, the greater the extent to which a customer consumes current for the heating load during the peak lighting load, the higher his heat rate automatically goes and the greater becomes the revenue to the company. When the light load dominates the heat load, the customer will then obtain the benefit of a reduction in the light load. The reduction will be slight, the rate never falling lower than 5¼¢ per kilowatt.

Referring to the drawings in detail, reference character 1 designates the incoming power line in a subscriber's installation. The subscriber's power transformer which may be on a pole or in a manhole is designated at 2. The incoming power lines extend from the secondary 3 of transformer 2 as indicated at 4 to the meter 5 through the fuses and main switch designated at 6 and 7. The meter 5 is included in the lighting load circuit designated at 8. A branch circuit comprising conductors 9 extends from the customer's side of the main switch 7 to the independent meter 10 which is connected in the industrial load circuit such as the heating circuit designated at 11. The rate fixing apparatus is connected between the independent meter circuits. This apparatus is entirely automatic and functions to permit the meters to register the lighting or heating load or power consumed, at any time throughout the twenty-four hours of the day, each character of load being registered upon its independent meter. The apparatus includes a set of independent polyphase relays designated at 12 and 14. The polyphase relays employed in the system of my invention are set forth in more detail in my Letters Patent No. 1,601,922, dated October 5, 1926 and No. 1,619,080 dated March 1, 1927. One application for the polyphase relay employed herein has been set forth in detail in my Letters Patent No. 1,753,383 dated April 9, 1930. Each relay includes independent polyphase windings. Relay 12 is shown having windings 12a and 12b, one winding of which is supplied with energy from the power line 4 through transformer 15, the primary winding 16 of which constitutes a current coil disposed in one side of the power line and the secondary winding 17 of which connects to the synchronous motor 18 in series with the winding 12a of polyphase relay 12. Motor 18 is mechanically coupled with generator 19 which supplies polyphase current to winding 12a of polyphase relay 12, and which also supplies polyphase current to winding 12b at 90° out of phase with the phase of the current through winding 12a. The armature 20 of polyphase relay 12 is shifted to a position shunting the contacts 21 or a position free of the contacts 21 according to whether or not the windings 12a and 12b are energized or deenergized. When the windings 12a and 12b are energized, armature 20 is moved to a position closing the contacts 21. Motor 18 will only be energized when the lighting load 8 is consuming current for otherwise there will be no current flow in the subscriber's circuit of sufficient magnitude to energize the polyphase relay 12 and operate the motor generator set. The closing of the contacts 21 controls the energization of the solenoid 22 for as it will be noted by tracing the connections, the closing of contacts 21 by member 20 completes the circuit through solenoid 22 across the lighting main. Any suitable form of relay may be actuated by solenoid 22 but for purposes of explaining the principles of my invention I have diagrammatically illustrated an armature member 23 which is attracted by solenoid 22 moving an insulated arm 24 about a suitable bearing, pivot or spring connection 25. Contact members 26, 27 and 28, are carried by arm 24 and operate the branch contacts 26a, 27a and 28a, respectively. The bridging of contacts 28a operates to shunt the winding 29 which is inductively coupled with the current coil 30 of meter 10. This results in the speeding up of meter 10 when a heating load is connected across the circuit at 11. This speeding up operates the change of rate of meter 10. This results in measuring part of the load which would be measured by meter 5 partially upon the meter 10. The fact that a heating load is being supplied at 11 is a condition precedent to the passage of current through meter 10 which results in a transfer of current through the current transformer 31 to the motor circuit 32 in series with the winding 14a of polyphase relay 14. The motor 32 drives generator 33 energizing winding 14b of polyphase relay 14. When these windings are both energized in 90° phase relationship by virtue of the motor generator connection there-with the member 34 is shifted to close contacts 35. This results in energizing solenoid 36, as solenoid 36 is connected across the power line which supplies the heating load 11. When solenoid 36 is energized armature 37 is attracted thus shifting insulated arm 38 and moving members 39 and 40 into position to close contacts 39a and 40a at the same time that the member 41 opens contacts 42. Contacts 42 normally serve to shunt winding 43, which is inductively coupled with the current coil 44 of meter 5. While the coil 43 is shunted the meter 5 operates at a high rate of speed. When the winding 43 is no longer shunted by reason of contact member 41 dropping away from the contacts 42 the meter 5 becomes a half rate meter. Therefore it will be at once obvious that it is to the customer's advantage to consume current at the heating load 11, for to do so results in a better over all rate as meter 10 has been speeded up while meter 5 has been reduced in speed. The conductors which extend to the lighting load 8 and to the heating load 11 are bonded one to another by reason of the connection from conductor 8a to contacts 26a, contact member 26, conductor 45, contacts 39a, contact member 39 through conductor 46 to the conductor 11a of the heating load circuit. At the same time connection is completed from conductor 11b to conductor 47, contacts 40a, contact member 40 through conductor 48, contacts 27a, contact member 27 through conductor 49 to the side 8b of the lighting load 8. The lighting load and heating load is thus connected in on the meter sides of both meters 5 and 10 resulting in a parallel connection between the loads to both of the meters. The resultant rate therefore becomes the sum of one-half the rates of each of the meters when used independently. This composite rate continues so long as both the heating and lighting loads are used simultaneously. If the heating load is dropped off the lighting load rate is automatically restored to the normal lighting rate. When the lighting load is dropped off the heating load is automatically restored to the normal heating rate.

My invention provides means for automatically changing the normal meter rates when the lighting and heating loads are operated simultaneously but either of the normal rates is restored as soon as the lighting or heating load is dropped off. This service is available for either heat or light or other industrial loads at any hour of the twenty-four hours of the day.

In Fig. 2 of the drawings I have shown a system of automatic polyphase control of single phase heating current which may be supplied during the peak load but measured at a higher rate than normal, such as the rate required for lighting loads. The meter 5 in Fig. 2 is shown for measuring the power consumed by the lighting load 8. The meter 10 measures the energy consumed by the heating load 11. The meter 10 registers at a special rate the energy supplied to the heating load. The lighting load 8 controls the heating meter and the latter is cut off from service at a predetermined light meter load. The point of cut off is arbitrary and adjustable and it may be so arranged that the heating meter 10 will measure a certain load until that moment when the lighting meter load 8 reaches a predetermined certain value, at which time the heating meter 10 will be automatically cut off and held off until the lighting load is restored to a certain predetermined value. This will allow a small amount of light and perhaps the operation of appliances on the lighting circuit while the heating circuit is energized. However when the peak lighting load comes on the situation undergoes a change and the heat meter load 11 is automatically cut off from the heating meter 10. The automatic operation is accompanied by means of the switch 50, the movement of which is controlled by closing coil 51 and tripping coil 52. A polyphase relay of the type hereinbefore described has been shown at 53 having windings 53a and 53b controlling a movable contactor 54. The motor generator set is illustrated as having motor 55 which is energized from winding 17 of the current transformer 16, this circuit also energizing winding 53a of the polyphase relay 53. The generator 56 which is driven by motor 55 energizes winding 53b of the polyphase relay 53, the current through winding 53b being 90° out of phase with the current through winding 53a. So long as the lighting load is on, the current transformer winding 17 is energized and the polyphase relay armature member 54 is in a position closing sets of contacts 54a, thus energizing the tripping coil 52 and maintaining the switch 50 in open position making it impossible to energize the heating load except from the lighting circuit through switch 57. When there is no current being drawn by the lighting load 8 the polyphase windings are deenergized and armature 54 moves to a position closing contacts 54b, thus energizing the closing coil 51 and automatically closing switch 50 to the heating load. It will therefore be seen that during peak lighting loads the heating load is not energized.

The polyphase relays employed in applicant's system are effective to shift the armature member when both relay windings are energized. As soon as one relay winding is energized the other relay winding becomes energized by operation of the generator which is driven by the motor. It will be seen that in the multiple relay circuit of Fig. 1 the relays are only actuated when the loads are drawing current from the independent meter circuits.

The system of my invention provides for greater economy in the use of electric current resulting in the more widespread co-operation between the public utility company and the customer, making it possible for subscribers to use electric current for many purposes where before this has been impracticable.

While I have described my invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. An electrical measuring system comprising a power distribution circuit, separate load circuits, electric meters interposed between each of said load circuits and said power distribution circuit and relay devices connected with each of said load circuits, said relay devices operating to change the rate of operation of said electric meters when said load circuits are energized simultaneously.

2. An electrical measuring system comprising a power distribution circuit, a plurality of load circuits, an electric meter interposed between each of said load circuits and said power distribution circuit, a polyphase relay connected with each of said load circuits and circuits controlled by each of said polyphase relays for connecting said load circuits effectively in parallel with said electric meters while changing the rate of operation of said electric meters when said load circuits consume power simultaneously.

3. An electrical measuring system comprising a power distribution circuit, a multiplicity of load circuits of different characteristics, an electric meter individual to each of said load circuits and connected with said power distribution circuit and polyphase means controlled by the simultaneous consumption of power in said load circuits for modifying the rate of operation of said electric meters and effectively connecting said load circuits in parallel with said meters for integrating the consumption of current by said load circuits.

4. An electrical measuring system comprising a power distribution circuit, a plurality of load circuits of different characteristics, an electric meter individual to each of said load circuits, polyphase means connected with each of said load circuits and means controlled by the polyphase means in one load circuit for changing the rate of operation of the electric meter in the adjacent load circuit when power is consumed by all of said load circuits simultaneously for integrating the consumption of current on said electric meters.

5. An electrical measuring system comprising a power distributing circuit, a plurality of load circuits, an electric meter individual to each of said load circuits, a polyphase relay connected with each of said load circuits and contactors operated by said polyphase relays for modifying the rate of operation of said electric meters and bonding said load circuits to said electric meters when current is consumed simultaneously by all of said load circuits.

In testimony whereof I affix my signature.

JOHN C. McDONALD.